Aug. 28, 1945.     A. G. POWELL     2,383,501
METHOD AND APPARATUS FOR GRINDING LENSES
Filed March 20, 1944
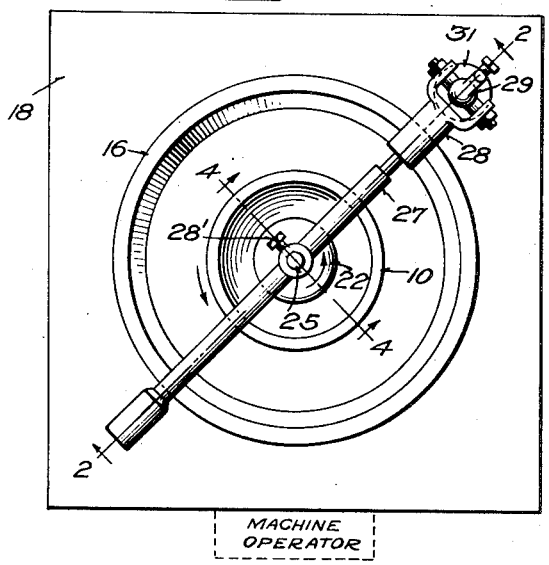
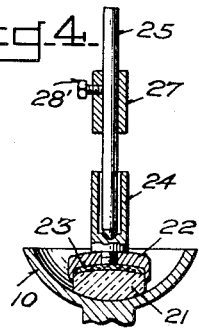
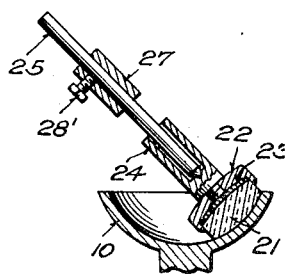
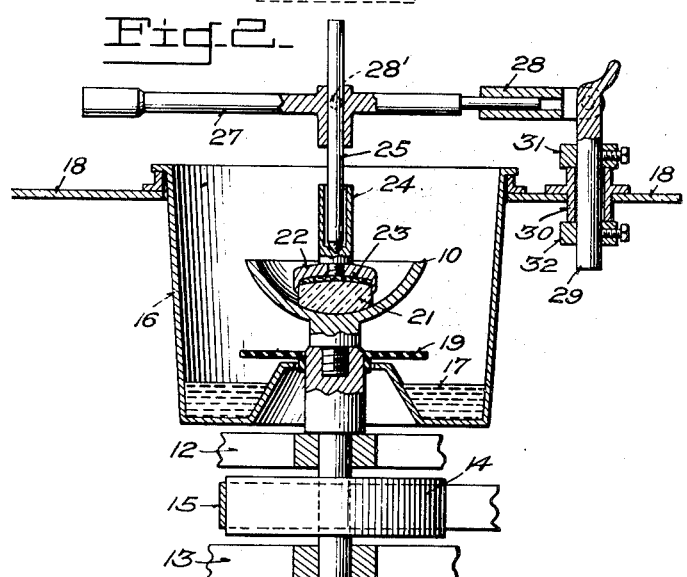
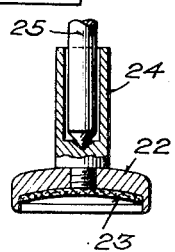
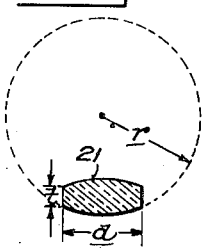
Inventor
ALBERT G. POWELL,
By C. E. Herrstrom & W. E. Thibodeau
Attorneys Patented Aug. 28, 1945

2,383,501

UNITED STATES PATENT OFFICE 2,383,501

METHOD AND APPARATUS FOR GRINDING LENSES

Albert G. Powell, Philadelphia, Pa.

Application March 20, 1944, Serial No. 527,322

1 Claim. (Cl. 51—124)

(Granted under the act of March 3, 1883, as amended April 30, 1928; 370 O. G. 757)

The invention described herein may be manufactured and used by or for the Government for governmental purposes, without the payment to me of any royalty thereon.

My invention relates to the grinding of optical lenses, and it has particular reference to an improved method and apparatus for grinding convex lenses to short radii of curvature.

Broadly stated, the object of my invention is to make possible a grinding of sharply curved convex lenses by mechanical apparatus rather than by hand.

A more specific object is to simplify the procedure of and reduce the time required for short radius lens grinding.

Another object is to lower the cost of and reduce the materials required by the grinding of sharply curved convex lenses.

A further object is to enable convex lenses to be finished to short radii of curvature by optical grinding machines of the convention "spindle" type.

A still further object is to prevent the lenses from chattering, hopping, chipping or otherwise breaking during high curvature grinding operations.

In applying my invention to lens grinding machines of the conventional "spindle" type I attain the foregoing and other objects by: (a) equipping the lens spinner chuck with a unique "sleeve" mounting by which tilt of the chuck with respect to the machine's pivot pin is at all times prevented; and (b) providing a "floating" type of mounting for the machine's grinding bar by which each sweeping of the lens across the curved grinding face of the rotating tool may be accompanied by a bar twisting action that keeps the lens properly aligned with the tool face.

In using a spindle grinding machine which has been so improved, the operator not only sweeps the lens across the arc of the tool's grinding face in usual manner but he also imparts to the grinding bar such twisting motion as is needed to keep the lens in proper alignment with the tool. With this method of manipulation the sleeve mounting for the spinner chuck prevents the lens from tilting away from the grinding tool's face, and by thus keeping it from hopping out of the chuck eliminates chattering, chipping and other breakage during grinding.

One illustrative embodiment of my improved grinding method and apparatus is shown by the accompanying drawing wherein:

Fig. 1 is a top plan view of a spindle type grinding machine to which my inventive improvements have been applied;

Fig. 2 is a section on line 2—2 of Fig. 1 showing my sleeve mounting for the lens chuck and my floating support for the grinding bar;

Fig. 3 is an enlarged representation of the sleeve mounted lens chuck of Figs. 1-2;

Fig. 4 is a section view on line 4—4 of Fig. 1 showing the chuck supported lens near one extreme in its range of sweeping travel across the inside face of the grinding tool;

Fig. 5 is a similar view showing the lens at the other extreme in its sweeping travel range; and Fig. 6 illustrates some of the factors upon which choice of lens grinding method must depend.

*The grinding apparatus of Figs. 1-2-3-4-5*

In Figs. 1-2 I have shown my improvements applied to a lens grinding machine of the conventional "spindle" type now extensively employed by the precision optical trade. This machine utilizes a grinding tool or lap 10 made of cast iron, bronze, cold rolled steel or brass, depending on the type of grinding to be done. Defined by the interior grinding surface of this tool is a section of a sphere whose radius is equal to that desired for the convex lens face to be ground.

Supporting this tool 10 in the upright position represented is a vertical spindle shaft 11 mounted for rotation in any suitable manner as by the aid of upper and lower bearings 12-13. Provision, such as an electric motor (not shown) or the represented pulley 14 and driving belt 15, is made for rotating this shaft at some suitable speed, usually in the range of from about 375 to 1000 R. P. M.

Surrounding the rotating grinding tool 10 in the manner shown is an emery pan 16 supported in position in any suitable manner as by the aid of the represented top rim which engages with the flanged edge of a circular opening in the machine's top or table surface 18. The spindle shaft 11 extends through an opening in the lower wall of this pan.

This lower pan wall is flared upwardly to form an open-topped cone around which a quantity of emery or other grinding abrasive 17 is placed. For making this emery adherent to the grinding tool when applied thereto by the machine operator a small quantity of water is also placed in the bottom of the pan.

For preventing leakage of the grinding abrasive down around spindle shaft 11 and into the bearings therebeneath use is made of a rubber washer 19 fitted onto the shaft above and covering the opening in the central cone of the emery pan. Liquid or other abrasive falling on the top surface of this washer is by centrifugal action thrown outwardly beyond the space which separates the pan wall from the rotating shaft.

The sleeve mounted spinner chuck

In the view of Fig. 2 the lens to be ground is represented at 21, and for holding this lens in contact with the interior surface of the rotating grinding tool 10 I make use of a lens chuck or spinner 22 having the improved design most clearly shown by Fig. 3.

The under side of this spinner 22 is cut away to receive the lens and will in most instances be provided with the represented flange which fits around the lens edge. The inside diameter of this flange is chosen to match with reasonably close clearance the outer diameter of the particular lens 21 to be ground, and the recess in member 22 is shaped to match the contour of the lens side opposite to that upon which the grinding tool 10 is to act. For protecting the lens 21 from direct contact with the metal of element 22, use is made of the usual disc 23 of felt or other cushioning material.

Secured in a central opening in the spinner member 22, as by screw threads or other suitable means, is the spinner sleeve or tube 24 of my invention. This sleeve may be made of metal or other suitable material and is of sufficient length to at all times maintain the lens chuck 22 in proper alignment with a pivot pin 25 by which the lens 21 is held in grinding contact with the rotating tool 10.

Length of this sleeve 24 is not critical, but experience shows that some operators may prefer a greater length for grinding with rough emery than for grinding with fine emery. In the former case the rate of wear tends to be greater and hence a longer section of sleeve 24 is of advantage in maintaining accurate alignment over extended periods of use.

The represented pivot pin 25 has the usual pointed end which fits into a cone-shaped depression in the closed bottom of the spinner sleeve 24. There is thus formed a bearing through which pressure from the pivot pin 25 is transmitted to the lens 21 for holding it in effective grinding contact with the rotating tool 10.

As the description proceeds it will become evident that the particular sleeve and pivot pin construction shown in Fig. 3 is only one of a number which may be used to accomplish the desired result. For example, the represented one-piece tube 24 may also consist of two parts, the tube itself which surrounds the pivot pin 25, and a bottom insert (not shown) of hardened steel or other metal against which the end of the pivot pin bears.

Ordinarily cold rolled steel or brass is found preferable for the sleeve 24, and with such material the mentioned insert of hardened steel offers superior wearing qualities. Such an insert, moreover, permits repeated resharpening of the pivot pin point to correct the results of wear over prolonged periods of use.

The machine's floating grinding bar

Supporting the upper end of the pivot pin 25 is a grinding bar represented at 27. This bar has a central opening through which the pin 25 extends and in which the pin may be clamped at any desired point along its length by the aid of a set screw 26.

The left end of this grinding bar takes the form of a handle which is grasped by the left hand of the machine operator whose position is as represented on the lower side of the top plan view of Fig. 1. The right end of the grinding bar 27 takes the form of a round rod which fits into a mating opening in a yoke 28. Securing this yoke to a vertical support shaft 29 is the represented hinge connection which permits free upward and downward swinging of the grinding bar.

This support shaft 29 is rotatably mounted in a journal 30 secured to the top plate 18 or other frame member of the machine. Upper and lower collars 31—32 clamped on this shaft above and below journal 30 serve to keep the shaft from moving upwardly or downwardly in the journal while at the same time permitting such rotative movement of the shaft as a side to side swinging of the grinding bar 27 may require.

Preferably the shaft 29 is so positioned in journal 30 and the pivot pin 25 is so positioned in the grinding bar 27 that when the lens 21 is in grinding contact with the rotating tool 10 the grinding bar 27 will be substantially horizontal, as shown in Fig. 2. Small deviations are, of course, permissible, and the exact adjustment somewhat depends on the preference of the individual operator.

In its fitting into yoke 28 the right end of bar 27 constitutes a joint which permits the bar to move with respect to the yoke both lengthwise and rotatively, and as the description proceeds it will be seen that a small amount of such lengthwise movement and a considerable amount of such rotative or twisting movement is essential to satisfactory practice of my new grinding method.

The new grinding technique

In using the improved lens grinding apparatus just described, the machine operator takes the position indicated in Fig. 1. Here his left hand can grasp the free end of grinding bar 27, and his right hand may be used to apply (either directly or by the aid of a brush or ladle) abrasive from the bottom of pan 16 to the interior of grinding tool 10.

The operator first places the lens blank to be ground in the spinner chuck 22 in contact with the felt 23 as shown at 21 in the drawing views. With the grinding tool 10 at rest, he now lowers the blank and chuck into the tool with his right hand; with his left hand he next lowers the pivot pin 25 into the spinner sleeve 24.

Grasping the grinding bar 27 at its free end with his left hand, the operator now twists the bar counterclockwise to a position bringing the lens blank 21 about half way between the center and the outer edge of the grinding tool 10. One such off-center lens position is indicated in Fig. 5. With his right hand, and by the aid of a brush, the operator applies abrasive 17 from the bottom of pan 16 to the interior of tool 10.

Thus far this grinding tool 10 has been at rest. Driving power is next applied to produce tool rotation at a satisfactory operating speed, usually in the range of from about 375 to 1000 R. P. M.

With his left hand the operator now manipulates grinding lever 27 in such a way that the lens blank 21 is pressed against the rotating tool 10 with appropriate force, and the lens blank is progressively swept back and forth between a first position close to the central one shown in Fig. 4 and a second position close to the tool edge as shown in Fig. 5. This sweeping action is relatively slow, and its purpose is to assure uniform grinding of the lens face and to protect the tool 10 from excessive wear in any one region.

All during this grinding operation further quantities of abrasive are applied to the tool's interior. By these applications there is maintained between the lens blank 21 and the tool 10 a thin layer of emery. This emery layer directly produces the desired abrasion; it also prevents grabbing and resultant chipping, splitting or other damage to the glass blank. Contributing to this prevention is a lubricating action of the water with which the emery is mixed.

During the named sweeping of the lens blank 21 across the grinding tool 10 and at all other times the improvements of my invention prove essential to a successful "machine" grinding of sharply curved convex lenses. The spinner sleeve 24 prevents the chuck 22 from tilting with respect to the pivot pin 25 and thus holds the lens in constant alignment with the pivot pin; the grinding bar 27's freedom to twist and to move lengthwise in yoke 28 thereby enables the operator to maintain the lens in proper contact with the grinding tool at all points in its range of sweep across the tool surface.

To sweep the lens from the tool 10's center towards the tool's outer rim the operator imparts counterclockwise twist to the grinding bar 27 (compare Figs. 4 and 5); and to return the lens from tool 10's outer edge toward the tool's center the operator imparts clockwise twist to the grinding bar (compare Figs. 5 and 4).

In practice the operator never allows the lens to completely reach the tool's center (where there is no grinding action and where seizure and chipping may occur), but instead he stops its inward sweep somewhat short of that position. Movement of the lens away from the center sets up relative motion between the tool and the lens and enables the abrasive to perform the desired grinding. The degree of this grinding appears to be maximum when the lens is at the outer position and approaches a minimum as the center of the tool is approached.

In manipulating the grinding bar 27, the operator soon acquires a "feel" through which he is enabled to keep the lens in firm and uniform contact with the grinding tool 10 at all positions in its range of tool sweep. By means of the spinner sleeve 24 this contact is maintained in a positive manner and the possibility of chattering, hopping, chipping or other breakage is thus reduced to a minimum.

*Advantages over the "spivvy" or regular spinner*

For sharply curved lens grinding the new construction of my invention constitutes a marked improvement over the conventional "spivvy" type of spinner.

The chuck of this previously known spinner is connected with the machine's pivot pin through a "spivvy" or point bearing which allows wide tilt of the spinner chuck with respect to the pin.

In this previously known arrangement the pivot pin is carried by a grinding bar of the general type shown at 27 in Figs. 1-2 but which differs from the improved arrangement used by me in utilizing a rigid connection between the bar and a yoke fixture corresponding to that shown at 28 in Figs. 1-2. That rigid connection (not shown) prevents any twisting or lengthwise movement of the bar with respect to the yoke and thus holds the pivot pin in a rigidly fixed position with respect to the bar yoke 28.

By reason of this fixed relation each sweeping of the lens 21 from the center toward the outer rim of the grinding tool 10 must be accompanied by a progressively increasing tilt between the spinner chuck and the pivot pin. As no tilt-resisting force can be transmitted from the pivot pin to the spinner chuck, such force is not available for holding the lens blank 21 in proper contact with the grinding tool.

For convex lenses where the curvature is relatively flat, the spivvy type of spinner just mentioned is found to be satisfactory. Such relatively flat lenses have little tendency to tip away from the tool's surface and their natural stability characteristics are sufficient to keep them in proper contact with the grinding tool.

In the case, however, of convex lenses having relatively sharp or steep curvatures the conventional spivvy type of spinner is found to be inadequate. Attempts to use it with such sharply curved lenses reveal that the stability characteristics of such lenses are so small that they cannot be maintained in proper contact with the grinding tool. Chattering, hopping, chipping and other breakage result, and the grinding operation is so unsuccessful that it cannot be accomplished in a spindle machine with a spivvy type spinner.

Prior to my improvement, in fact, such sharply curved lenses had to be ground by placing each one on the end of a stick (not shown), by the aid of wax or other sealing compound, and then holding the so mounted lens in contact with a specially grooved grinding tool (not shown) or other abrasive member. Grinding by this method was laborious and required objectionable amounts of time, typically of the order of from 3 to 4 times those incident to grinding by my improved method.

The improvements of my invention thus are particularly useful in connection with the grinding of such sharply curved lenses. By reason of my positive holding (by spinner sleeve 24) of the lens in its desired position of contact with the grinding tool, the difficulties experienced with the spivvy spinner are completely overcome and grinding of sharply curved convex lenses by a spindle machine becomes not only possible but highly practical.

*Summary*

One empirical rule for determining the degree of lens curvature for which the "sleeve" spinner method of my invention must be used in preference to the "spivvy" spinner method involves a comparison of the radius of curvature of the lens face with the diameter of the lens circumference. In the view of Fig. 6 these two quantities are respectively designated as $r$ and $d$.

When the ratio of $r$ to $d$ is less than about 1.00 the tilting tendency of the lens is too great to permit use of the spivvy spinner, and recourse to my improved sleeve spinner must then be had. When, however, the named ratio is greater than about 1.00 or 1.50 the stability characteristics of the lens usually are sufficient to permit grinding by the spivvy method.

It will, of course, be understood that the foregoing rule is approximate only and hence can be used only as a general guide in determining which of the two methods is to be chosen.

In the drawing showing has been made of a lens 21 which has an appreciable thickness $t$ (see Fig. 6) at its edge. This showing is only for purposes of illustration and greater clarity of representation.

Actually a majority of the lenses which have to date been ground by my improved method have had relatively thin or knife edges. As to them all of the advantages earlier explained for my new grinding procedure apply with the same effect as to the thick edge lens which the drawing shows by way of illustration.

From the foregoing it will be seen that I have provided an improved method and apparatus for grinding convex lenses to short radii of curvature; that I have made possible a grinding of such sharply curved convex lenses by mechanical apparatus rather than by hand; that I have simplified the procedure of and reduced the time required for short radius lens grinding; that I have lowered the cost of and reduced the materials required by the grinding of sharply curved convex lenses; that I have enabled such lenses to be finished to short radii of curvature by grinding machines of the conventional "spindle" type; and that I have prevented chattering, hopping, chipping and other breakage of lenses during high curvature grinding operations thereon.

My inventive improvements are, therefore, extensive in their adaption and hence are not to be restricted to the specific form here disclosed by way of illustration.

I claim:

In a machine for grinding optical lenses, the combination of a cup shaped grinding tool having an interior contour simulating the surface of a sphere with radius equal to that desired for the face of a convex lens to be ground, means for rotating said tool about an axis extending centrally therethrough, a spinner chuck shaped to receive a lens blank and deisgned to maintain one face of said blank in contact with the interior surface of said grinding tool, a pivot pin bearing against the back of said chuck at the center thereof and permitting the spinner freely to follow the rotation which said tool imparts to said lens blank, a manually movable grinding lever supporting said pivot pin from a point intermediate its two ends and being secured at one of said ends by a connection which provides hinging action in all directions and further permits free twisting plus longitudinal movement of the lever, a handle on said lever's free end by which an operator may cause said pivot pin to press said lens against the interior of said grinding tool and at the same time sweep the lens back and forth from the center to one edge of said tool's curved grinding surface, and a sleeve surrounding said pivot pin and rigidly secured to the back of said spinner chuck whereby to prevent tilt of said chuck with respect to said pin and thereby positively maintain said lens in uniform contact with said grinding tool at all times.

ALBERT G. POWELL.